United States Patent
Hermey

(10) Patent No.: US 9,188,194 B2
(45) Date of Patent: Nov. 17, 2015

(54) ENERGY GUIDING CHAIN WITH ROLLERS

(71) Applicant: igus GmbH, Cologne (DE)

(72) Inventor: Andreas Hermey, Hennef (DE)

(73) Assignee: Igus GmbH, Cologne (DE)

(*) Notice: Subject to any disclaimer, the term of this patent is extended or adjusted under 35 U.S.C. 154(b) by 0 days.

(21) Appl. No.: 14/395,126

(22) PCT Filed: Apr. 16, 2013

(86) PCT No.: PCT/EP2013/057889
§ 371 (c)(1),
(2) Date: Oct. 17, 2014

(87) PCT Pub. No.: WO2013/156469
PCT Pub. Date: Oct. 24, 2013

(65) Prior Publication Data
US 2015/0128556 A1   May 14, 2015

(30) Foreign Application Priority Data
Apr. 19, 2012  (DE) .................... 20 2012 003 903 U

(51) Int. Cl.
*F16G 13/16*   (2006.01)
*H02G 11/00*   (2006.01)

(52) U.S. Cl.
CPC .............. *F16G 13/16* (2013.01); *H02G 11/006* (2013.01)

(58) Field of Classification Search
CPC ........................................................ F16G 13/16
USPC ........................................................ 59/78.1
See application file for complete search history.

(56) References Cited

U.S. PATENT DOCUMENTS

| | | | | | |
|---|---|---|---|---|---|
| 6,425,238 | B1* | 7/2002 | Blase | ............................ | 59/78.1 |
| 7,444,800 | B2* | 11/2008 | Hermey | ......................... | 59/78.1 |
| 7,497,072 | B2* | 3/2009 | Hermey | ......................... | 59/78.1 |
| 7,500,346 | B2* | 3/2009 | Blase | ............................ | 59/78.1 |

FOREIGN PATENT DOCUMENTS

| DE | 2656638 A1 | 6/1978 |
|---|---|---|
| DE | 19715531 | * 10/1998 |

(Continued)

OTHER PUBLICATIONS

English language International Search Report mailed Jul. 9, 2013, received in corresponding PCT Application No. PCT/EP13/57889, 3 pgs.

(Continued)

*Primary Examiner* — David B Jones
(74) *Attorney, Agent, or Firm* — Grossman Tucker Perreault & Pfleger, PLLC

(57) ABSTRACT

An energy guiding chain for guiding hoses, cables and the like, comprising a number of chain links which are connected to one another in an articulated manner and are formed by mutually parallel link plates and cross members connecting the lateral link plates, the link plates being linked to form parallel strands of link plates wherein each lateral link plate strand is formed by alternating inner link plates and outer link plates. At least some of the outer link plates are provided with rollers, whereas only the inner link plates comprise limit stops which delimit the pivot angle between adjoining link plates. The energy guiding chain offers improved running behavior, which can be adjusted in a simple manner to different radii of curvature, and which can be produced economically.

4 Claims, 5 Drawing Sheets

(56) References Cited

FOREIGN PATENT DOCUMENTS

| | | | |
|---|---|---|---|
| DE | 102004038817 A1 | | 3/2005 |
| DE | 202006006638 | * | 1/2006 |
| DE | 102005041689 A1 | | 3/2007 |
| DE | 202011004762 U1 | | 9/2011 |
| JP | 06182463 A | | 7/1994 |
| WO | 9831950 A1 | | 7/1998 |

OTHER PUBLICATIONS

English language Translation of the International Preliminary Report on Patentability/Written Opinion mailed Oct. 30, 2014, received in corresponding PCT Application No. PCT/EP13/57889, 7 pgs.

* cited by examiner

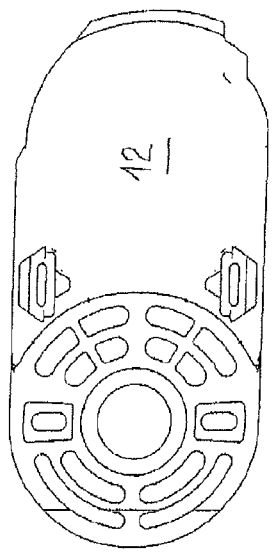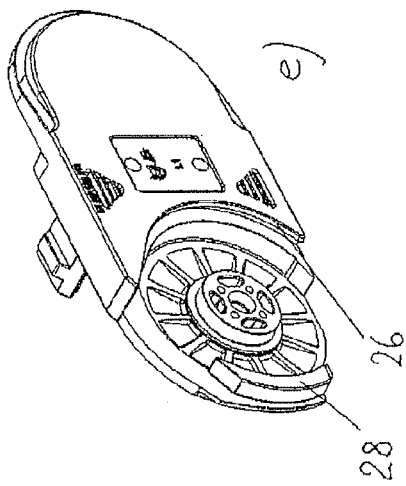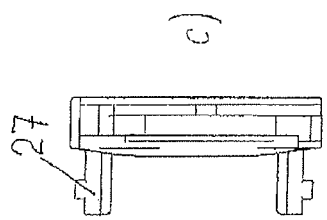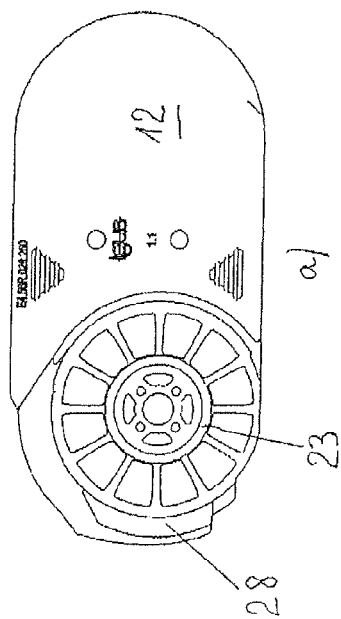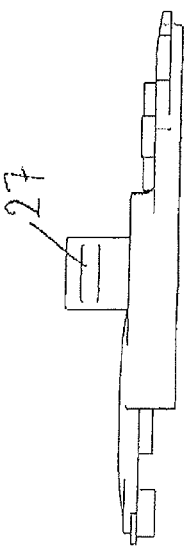
Fig. 3

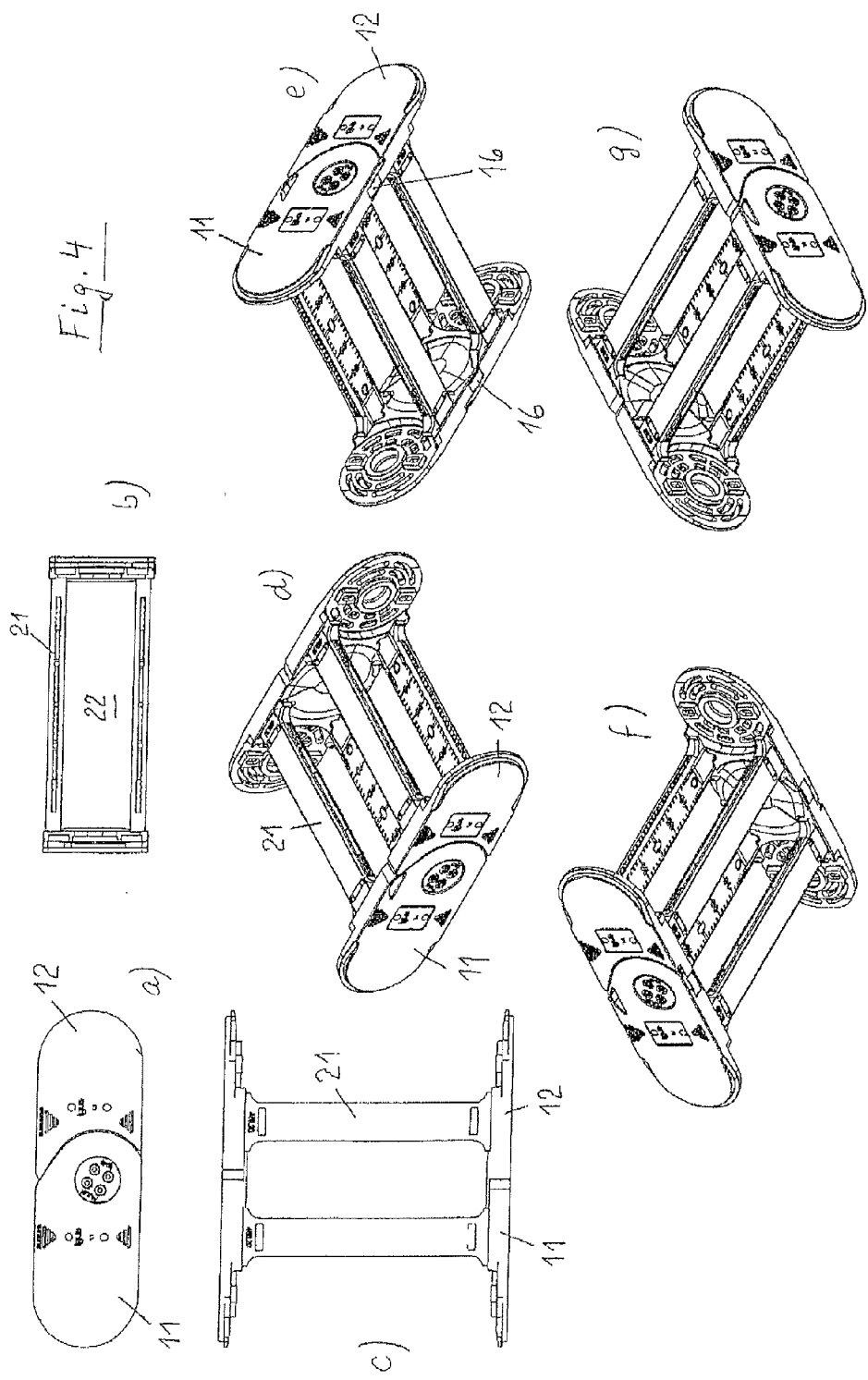

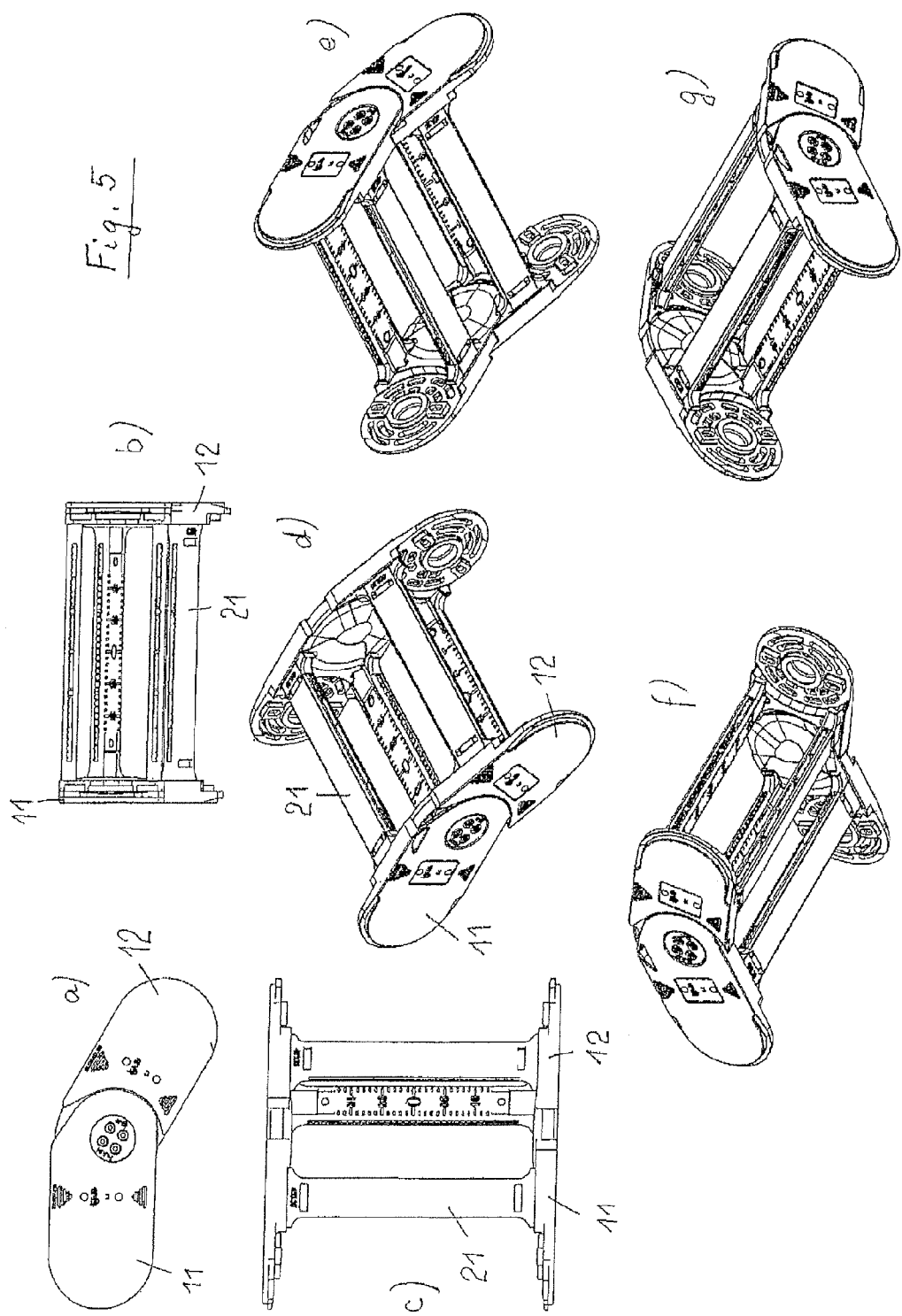

ENERGY GUIDING CHAIN WITH ROLLERS

The invention relates to an energy guiding chain according to the preamble of the main claim.

Such energy guiding chains are used in order to supply a consumer which is movable relative to a stationary connection point with sources of energy such as electricity, water, gas and the like, and/or to transmit signals. They are composed of a plurality of chain links which are pivotable relative to each other, are made up of two mutually opposite link plates and cross members that connect said link plates, and can thus accommodate cables, hoses and the like in the space that is formed in this manner. The space can further be subdivided by separators between the cross members. For the purpose of adjustment to the distance from the connection point which changes during the movement of the consumer, the energy guiding chain forms a loop having an upper strand, a lower strand and a deflection zone with a radius of curvature which is predetermined by limiting the pivot angle between adjacent link plates. The upper strand can rest at least partly on the lower strand and slide thereon during the movement of the consumer. The required radii of curvature in the deflection zone can differ depending on the spatial conditions, the length of the chain, the weight and the properties of the supply lines accommodated by the chain etc. Guide rails can be provided in order to prevent the chain from breaking away in the lateral direction.

It is a general object in the configuration of such energy guiding chains that the movement of the upper strand on the lower strand can occur as securely as possible, in an energy-saving way and by producing as little noise as possible. For this purpose, the faces of the chain links facing the interior of the loop are provided the smoothest possible configuration and can additionally be provided with rollers.

The German utility model DE 20 2006 006 638 U1 describes such a chain, whose lateral link plates are provided with rollers which can roll off a running surface which is formed by the narrow sides of the lateral link plates of the stretched opposite strand. The lateral link plates of a strand of lateral link plates are offset in this chain in such a way that they face partly to the outside and partly to the inside. Rollers are installed at least partly in these lateral link plates.

DE 197 15 531 A1 discloses a different configuration of an energy guiding chain without rollers. In this case, each strand of lateral link plates is composed of alternating inner and outer link plates which are connected to each other. Accordingly, each chain link either consists of two inner link plates or two outer link plates, which are respectively provided with respective cross members. The maximum pivot angle between adjacent link plates, and thus the minimum radius of curvature of the chain, is defined by limit stops in the overlapping regions of both types of link plates.

It is the object of the present invention to provide an energy guiding chain which offers improved running behaviour on the one hand, and can be adjusted on the other hand in a simple manner to different radii of curvature, and which can be produced economically.

This object is achieved by an energy guiding chain according to the main claim.

It was surprisingly noticed that it is sufficient for a smooth displacement of the energy guiding chain that only the outer link plates are provided with rollers. The rollers are embedded in the lateral link plates, so that they are housed in a stable fashion and cannot collide with optionally provided guide elements. Depending on the width, length, loading and other application data of the energy guiding chain, it can be adequate to provide only some of the outer link plates with rollers. It is also possible in accordance with the invention that all outer link plates can be provided with rollers. A distance of the rollers in the longitudinal direction of the chain has proven to be useful in practice with a magnitude of 0.3 to 2 m, preferably 0.5 to 1 m.

In the energy guiding chain in accordance with the invention, the outer link plates with the rollers, which are more difficult to produce, only need to be produced and kept on stock in one version for each size, because the minimum radius of curvature is only determined via the simpler arranged inner link plates. It is thus clear that the required variety of different chains can be provided by a lower number of different parts.

The outer link plates are composed of two link plate parts (pairs of link plates) in a preferred embodiment, which are pivotable relative to each other about a common pivot axis. The pivot angle is also limited in this case by a limit stop on a link plate part in interaction with an abutment on the other link plate part. Although it is principally possible to also variably arrange the maximum pivot angle within the outer link plate by using different link plate parts, it has been seen that it can be sufficient to work with a fixed pivot angle within the outer link plate and to determine the radius of curvature only via the limit stops on the inner link plates. The advantage of the invention as explained above can thus also be maintained in this embodiment.

The roller is appropriately arranged in the outer link plate in this embodiment in such a way that its rotary axis coincides with the pivot axis of the link plate parts within the outer link plate.

The outer link plate which is provided with the roller is preferably arranged in such a way that the distance between the two pivot axes which are common with those of the adjacent inner link plates is twice as large as the distance of the two pivot axis of an inner link plate from the adjoining outer link plates. Equidistance between the pivot axes is obtained again by forming the outer link plates as pairs of link plates.

The pairs of the outer link plates are appropriately arranged in such a way that their exterior joint regions, which overlap during assembly with the joint regions of the adjacent inner link plates, are arranged in a mirror-symmetrical manner relative to the vertical central plane (transversely to the longitudinal direction of the link plates) and in a mirror-symmetrical manner relative to the horizontal central plane.

The rotary axis of the roller can be arranged in such a way that its distance from the inner narrow side of the strand of link plates is smaller than the distance from the exterior narrow side.

The narrow sides of the lateral link plates form a continuous running surface in the elongated state of the chain, on which the rollers of the opposite strand which protrude from the narrow sides can roll off. It is generally sufficient for secure functionality if the rollers protrude by 0.5 to 2 mm for example from the narrow side of the lateral link plates.

The cross members are preferably fixed by means of suitable fastening means to the lateral link plates. Such fastening means can be elastic latched connections for example, in which a pin attached to the lateral link plate latches in an elastic manner with a projection into a recess in the cross member. These connections can be arranged in such a way that they can be released by hand. It is also possible to provide connections which cannot be released or only by means of a special tool.

It is a special advantage of the invention that the outer link plates with the features in accordance with the invention can be used easily in existing energy guiding chains without rollers, e.g. according to DE 197 15 531 or the product line E4 of the applicant, in exchange for outer link plates present in such chains. As a result, such chains can also utilise the advantages of the rollers. The exchange can occur in many cases without dismounting the entire energy guiding chain. As already mentioned above, the exchange of a few outer link plates is sufficient depending on the application data.

The invention will now be explained in closer detail by reference to the enclosed drawings, wherein:

FIG. 3 shows the second part of a pair of outer link plates in a) a view from the outside, b) a view from the inside, c) a side view, d) a top view and e) an oblique view;

FIG. 4 shows a chain link with a pair of outer link plates in the elongated state in a) a view from the outside, b) a view in the longitudinal direction of the chain, c) a top view, d), e), f), g) in different oblique views;

FIG. 5 shows a chain link with a pair of outer link plates in the pivoted state in a) a view from the outside, b) a view in the longitudinal direction of the chain, c) a top view, d), e), f), g) in different oblique views.

Figure 1:
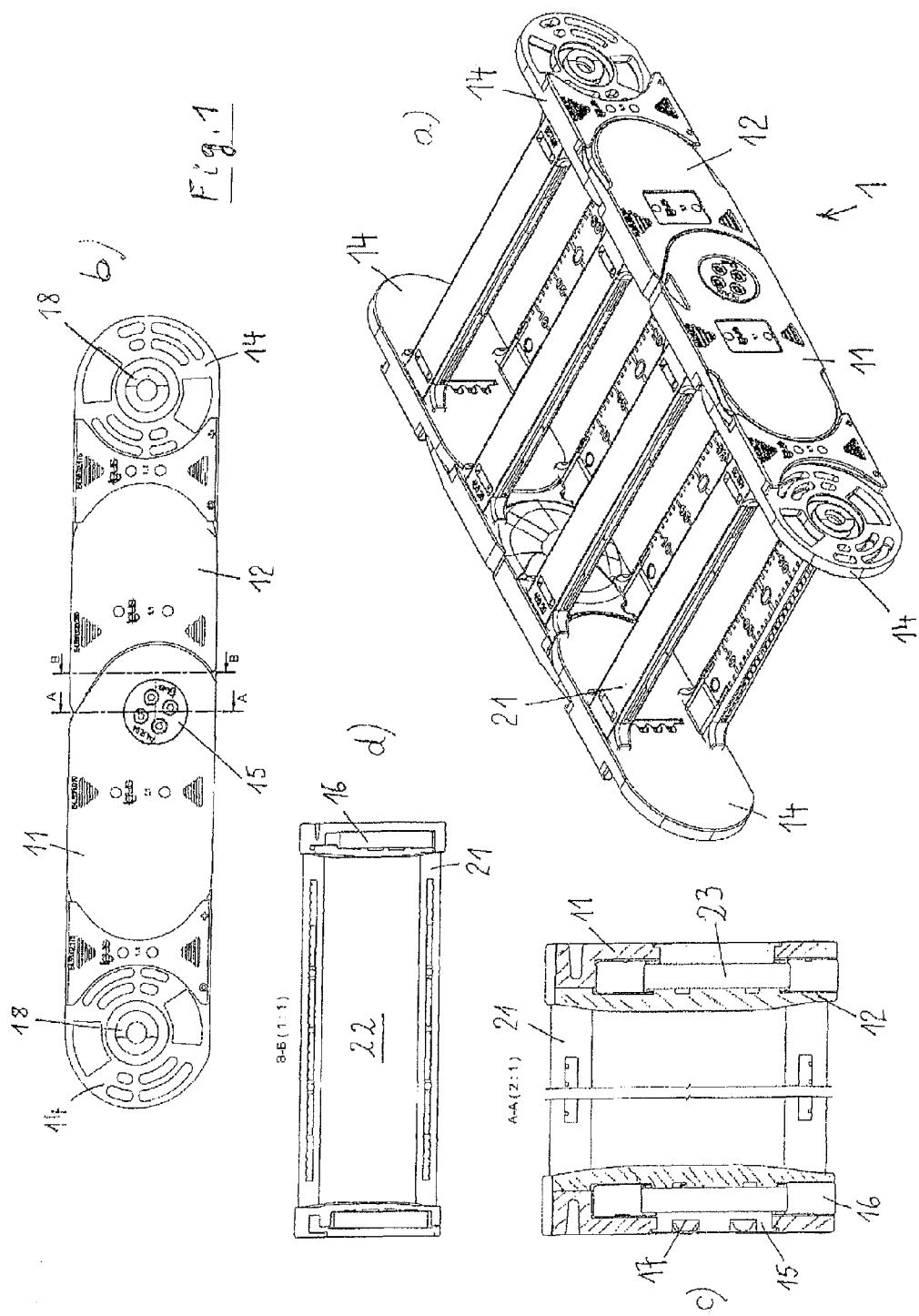
FIG. 1 shows a part of an energy guiding chain in accordance with the invention with a pair of outer link plates and two inner link plates in a) an oblique view, b) a side view, c) a cross-sectional view A-A, and d) a cross-sectional view B-B.

FIG. 1a) shows an oblique view of a part of an energy guiding chain 1 with a pair of outer link plates 11, 12 and two inner link plates 14 which are connected thereto in an articulated manner. The illustration shows that the chain can be continued at the two ends by connecting further pairs of outer link plates 11, 12 in an alternating fashion with inner link plates 14. Each part 11, 12 of the pairs of outer link plates and each inner link plate 14 is connected via two respective cross members 21 to the respective part of the other strand of link plates, so that a space 22 (FIG. 1c) is formed for accommodating the supply lines. FIG. 1b) shows this sectional view from the outside in the elongated state. Pivot pins 18 can be recognised on the inner link plates, which pivot pins are rotatably inserted into respective pivot sleeves 19 (see FIG. 2b) during the connection with the outer link plates.

FIG. 1c) shows a cross-section through a chain link with pairs of outer link plates at the location of the rotary axis of the rollers 16 which coincides with the pivot axis. The rollers are mounted on the pivot 23, optionally with a ball bearing ring, and protected to the outside by a cover 15 which is fixed by means of screws 17. The roller 16 slightly protrudes on the narrow inner side of the outer link plates beyond the link plate parts 11, 12, so that it can roll off the running surface of the opposite strand without the chain links touching each other beyond this. The illustration also shows that the roller 16 only protrudes on the inside because its rotary axis is situated closer to the inside. FIG. 1d) shows again that the roller 16 is completely embedded in the outer link plate, apart from the slight section which is shown in FIG. 1c).

FIG. 2a) shows the first link plate part 11 as seen from the outside of the chain. The illustration shows an opening 24 which accommodates the cover 15 (FIG. 1b), and a spring 25 which engages in a respective groove 26 (FIG. 3e) of the second link plate part 12 in order to stabilise the pair of link plates. FIG. 2b) shows the same part from the inside. The illustration additionally shows the pivot sleeve 19 for accommodating the pivot pin 18 on the inner link plate 14 (FIG. 1b). FIG. 2c) shows a side view of said link plate part 11 and also shows the pins 27 for accommodating the cross members 21 (FIG. 1). These features are also shown in the top view of FIG. 2d) and in the oblique view of FIG. 2e).

Figure 2:
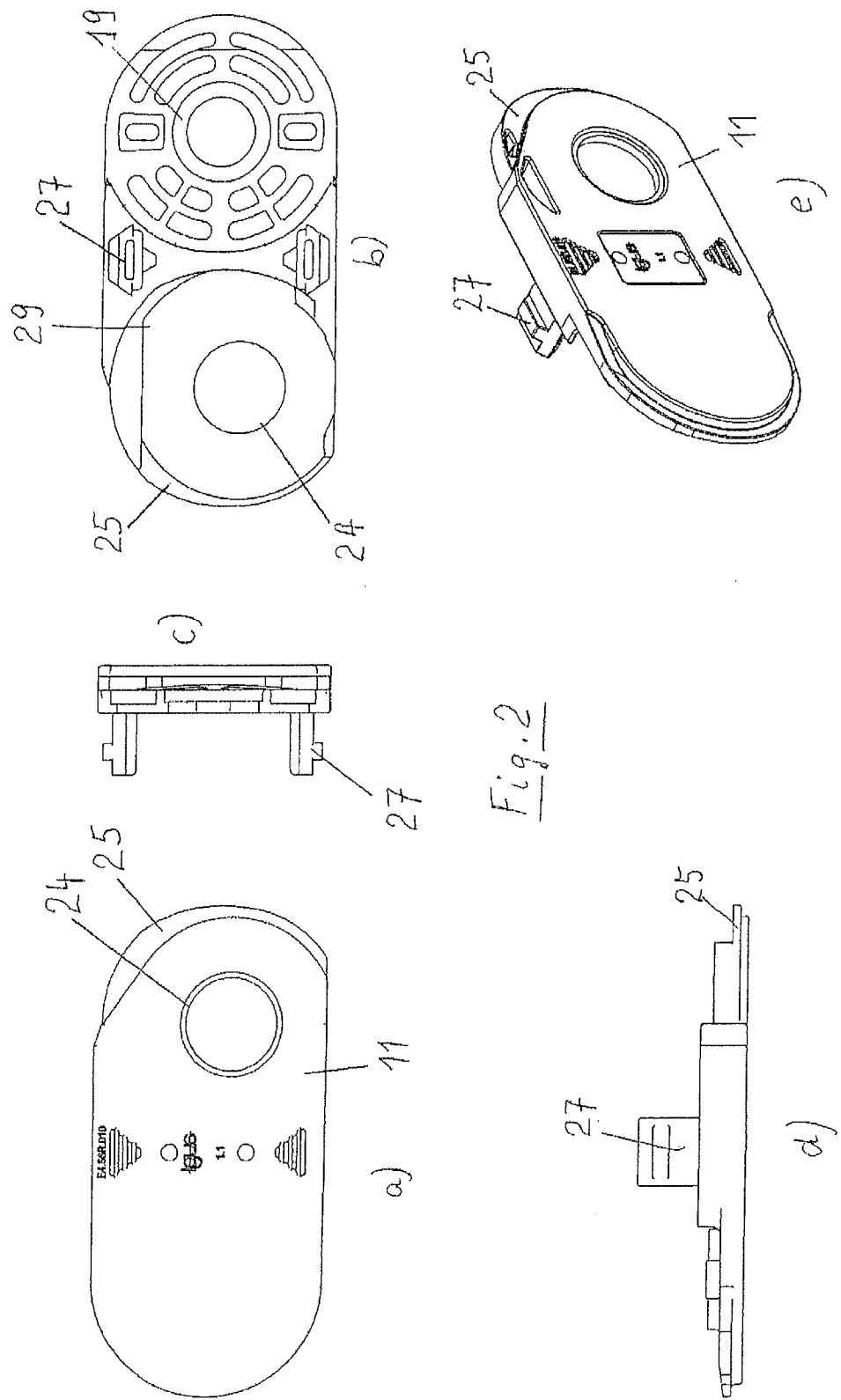
FIG. 2 shows the first part of a pair of outer link plates in a) a view from the outside, b) a view from the inside, c) a side view, d) a top view and e) an oblique view.

FIG. 3 shows the views corresponding to FIG. 2 for the second link plate part 12. It comprises a pivot 23 for accommodating the roller 16 which is optionally supported by ball bearings (not shown here). Furthermore, a limit stop 28 is provided which limits the pivot angle during the pivoting by contact with the abutment 29 in the first link plate part (FIG. 2b). As already mentioned above, the groove 26 is used for accommodating the spring 25.

FIG. 4 shows a chain link with pairs of outer link plates in the elongated state in different views: FIG. 4a) shows a view from the outside of the chain, FIG. 4b) shows a view in the longitudinal direction of the chain, FIG. 4c) shows a top view, FIGS. 4d) to 4f) show oblique views of the chain link from different directions. FIG. 4e) clearly shows the roller 16 which protrudes only slightly between the link plate parts 11 and 12.

FIG. 5 shows the same chain link in the pivoted state in the same views. The roller is covered in this case by the narrow side of the link plate part 12. This is obviously no problem because the pivoting only occurs in the deflection zone in which there is no contact between the upper strand and the lower strand. The scales on the cross members provide assistance in subdividing the space and in the attachment of separators.

LIST OF REFERENCE NUMERALS

1 Energy guiding chain
11 First outer link plate part
12 Second outer link plate part
14 Inner link plates
15 Cover
16 Roller
17 Screw
18 Pivot pin
19 Pivot sleeve
21 Cross member
22 Space for supply lines
23 Pivot
24 Opening for cover
25 Spring
26 Groove
27 Pin for cross member
28 Limit stop
29 Abutment

What is claimed is:

1. An energy guiding chain for guiding hoses and/or cables, comprising:
    a plurality of chain links connected to one another in an articulated manner and formed by a plurality of lateral link plates and cross members connecting the lateral link plates, the lateral link plates being linked to form parallel strands of link plates,
    wherein the lateral link plates are pivotable relative to one another about a pivot axis that is common to two respectively adjacent lateral link plates,
    wherein the energy guiding chain is displaceable in such a way that it forms a loop having an upper strand, a lower strand, and a deflection zone connecting the upper and lower strands, thus defining an inner face and an outer face of the chain links in relation to the loop,
    wherein the upper strand lies on the lower strand under at least partial contact of the inner face of chain links,
    wherein at least some of the chain links are provided with rollers which are inserted into the lateral link plates, are exposed on the inner face, and are rollable off a running surface formed by the inner face, wherein the lateral link plates of each parallel strand are formed of inner link plates and outer link plates, wherein each parallel strand is formed by alternating the inner link plates and the outer link plates, wherein at least some of the outer link plates are provided with the rollers, and wherein only the inner link plates comprise limit stops which delimit a pivot angle between adjoining link plates.

2. An energy guiding chain according to claim 1, wherein at least some of the outer link plates are composed of two link plate parts which are pivotable relative to each other about a pivot axis.

3. An energy guiding chain according to claim 2, wherein the assembled outer link plates are provided with rollers which have a rotary axis which coincides with the pivot axis of the link plate parts.

4. An energy guiding chain according to claim 1, wherein the cross members are fixed by means of fastening means to the lateral link plates.

\* \* \* \* \*